United States Patent Office 2,786,061
Patented Mar. 19, 1957

2,786,061

N-(THIOCARBAMYLTHIO)-2-BENZOTHIAZOLE-SULFENAMIDES

Norman K. Sundholm, Naugatuck, Conn., assignor to United States Rubber Company, New York, N. Y., a corporation of New Jersey No Drawing. Application August 19, 1955,
Serial No. 529,580

6 Claims. (Cl. 260—306.6)

This invention relates to a new class or organic compounds which are useful as accelerators for the vulcanization of rubber or other vulcanizable rubberlike substances.

The primary object of the invention is to provide new accelerators which combine scorch resistance with accelerating strength. Another object is to provide a process for the preparation of these accelerators.

The accelerators of the present invention are the new N-(thiocarbamylthio)-2-benzothiazolesulfenamides, which are represented by the structural formula

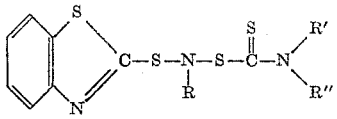

where R, R', and R'' are members of the group consisting of hydrogen, alkyl, cycloalkyl, and aralkyl radicals, or R' and R'' taken jointly represent a single organic diradical. Examples of alkyl radicals include methyl, ethyl, n-propyl, isopropyl, n-butyl, sec-butyl, tert-butyl, n-amyl, and 2-ethylhexyl. Examples of cycloalkyl radicals are cyclohexyl and methylcyclohexyl. Examples of aralkyl radicals are benzyl and beta-phenethyl. Examples of organic diradicals are pentamethylene and oxydiethylene.

These organic compounds are readily prepared by the reaction in the presence of a tertiary aliphatic amine of 2-benzothiazolesulfenyl chloride with an S-(thiocarbamyl)hydrosulfamine having the structural formula

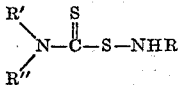

where R, R', and R'' have the same definition as given above. The equation for this reaction using triethylamine as the tertiary aliphatic amine is

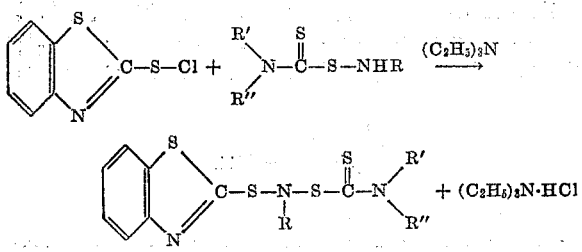

The reaction is conducted by adding a solution of 2-benzothiazolesulfenyl chloride to a mixture of the S-(thiocarbamyl)hydrosulfamine and the tertiary amine in a suitable organic solvent. Suitable hydrogen chloride acceptors include the tertiary aliphatic amines such as triethylamine, tripropylamine, N-methylmorpholine, tributylamine, triamylamine, etc. The 2-benzothiazolesulbenyl chloride is prepared by the chlorination of benzothiazolyl disulfide in an organic solvent according to W. E. Messer, U. S. Patent No. 2,257,974.

The S-(thiocarbamyl)hydrosulfamines, as intermediates for the synthesis of the new accelerators, were prepared by either of two methods. One is a method described by Smith, Alliger, Carr, and Young, Journal of Organic Chemistry, vol. 14, page 935 (1949), in which an alkali dithiocarbamate is reacted with an N-chloroamine. The other method is the reaction of an amine with a thiuram disulfide.

Examples of N-(thiocarbamylthio)-2-benzothiazolesulfenamides and their preparation and properties are as follows:

*N-ethyl-N-(dimethylthiocarbamylthio)-2-benzothiazolesulfenamide*

Chlorine (14.5 grams) was passed in above a stirred suspension of 68 grams of technical benzothiazolyl disulfide in 500 ml. of anhydrous ethylene chloride at 25–30° C. during 30 minutes. The resulting dark red solution of 2-benzothiazolesulfenyl chloride was added dropwise to a stirred solution of 65.6 grams of N-ethyl-S-(dimethylthiocarbamyl)hydrosulfamine and 41.4 grams of triethylamine in 200 ml. of anhydrous ethylene chloride during two hours. The temperature of the reaction mixture was kept at 15–20° C. during the addition. After one-half hour of stirring following completion of the addition, the mixture was filtered and the triethylamine hydrochloride washed with 100 ml. of ethylene chloride. The wash was added to the filtrate and the ethylene chloride removed. The residual product was purified by recrystallization from ethanol to give 43 grams of colorless crystals melting at 92.5–93.5° C.

*Analysis.*—Calculated for $C_{12}H_{15}N_3S_4$: N, 12.77. Found: N, 12.71.

The remaining examples were prepared using the above procedure.

*N-methyl-N-(dimethylthiocarbamylthio)-2-benzothiazolesulfenamide*

This compound, prepared from N-methyl-S-(dimethylthiocarbamyl)hydrosulfamine, 2-benzothiazolesulfenyl chloride, and triethylamine, was purified by recrystallization from ethanol to give colorless crystals melting at 148–149° C.

*Analysis.*—Calculated for $C_{11}H_{13}N_3S_4$: N, 13.33. Found: N, 13.11.

*N-isopropyl-N-(dimethylthiocarbamylthio)-2-benzothiazolesulfenamide*

This compound, prepared from N-isopropyl-S-(dimethylthiocarbamyl)hydrosulfamine, 2-benzothiazolesulfenyl chloride, and triethylamine, was purified by recrystallization from ethanol to give colorless crystals melting at 120° C.

*Analysis.*—Calculated for $C_{13}H_{17}N_3S_4$: N, 12.24. Found: N, 11.99.

*N-tert-butyl-N-(dimethylthiocarbamylthio)-2-benzothiazolesulfenamide*

This compound, prepared from N-tert-butyl-S-(dimethylthiocarbamyl)hydrosulfamine, 2-benzothiazolesulfenyl chloride, and triethylamine, was purified by recrystallization from ethanol to give colorless crystals melting with decomposition at 160–161° C.

*Anaylsis.*—Calculated for $C_{14}H_{19}N_3S_4$: N, 11.76. Found: N, 11.61.

N-cyclohexyl-N-(diethylthiocarbamylthio)-2-benzothiazolesulfenamide

This compound, prepared from N-cyclohexyl-S-(diethylthiocarbamyl)hydrosulfamine, 2 - benzothiazolesulfenyl chloride, and triethylamine, was purified by recrystallization from ethanol to give colorless crystals melting at 131–132° C.

*Analysis.*—Calculated for $C_{18}H_{25}N_3S_4$: N, 10.22. Found: N, 10.00.

N - cyclohexyl - N - (oxydiethylenethiocarbamylthio)-2-benzothiazolesulfenamide This compound, prepared from N-cyclohexyl-S-(oxydiethylenethiocarbamyl)hydrosulfamine, 2-benzothiazolesulfenyl chloride, and triethylamine, was purified by recrystallization from ethylene chloride and then from ethanol to give colorless crystals melting with decomposition at 171° C.

*Analysis.*—Calculated for $C_{18}H_{23}N_3OS_4$: N, 9.88. Found: N, 9.65.

To demonstrate the utility of the new compounds as accelerators for the vulcanization of rubber, some of them and a commercial accelerator, benzothiazolyl disulfide, were compared in the following formula:

| | Parts by weight |
|---|---|
| Smoked sheet | 100 |
| Super abrasion furnace black | 45 |
| Zinc oxide | 5 |
| Zinc salts of cocoanut oil acids | 3.5 |
| Pine tar | 3.5 |
| Antioxidant | 2.0 |
| Sulfur | 2.25 |
| Accelerator | 0.5 |

Stocks were compounded containing as the accelerator the following:

| Stock | Accelerator |
|---|---|
| A | Benzothiazolyl disulfide. |
| B | N-Methyl-N-(dimethylthiocarbamylthio)-2-benzothiazolesulfenamide. |
| C | N-Ethyl-N-(dimethylthiocarbamylthio)-2-benzothiazolesulfenamide. |
| D | N-Isopropyl-N-(dimethylthiocarbamylthio)-2-benzothiazolesulfenamide. |
| E | N-Cyclohexyl-N-(diethylthiocarbamylthio)-2-benzothiazolesulfenamide. |
| F | N-Cyclohexyl-N-(oxydiethylenethiocarbamylthio)-2-benzothiazolesulfenamide. |

The stocks were cured by heating in a press at 274° F. for 20 and 45 minutes. The physical properties of the respective stocks at the respective curing times are given in the following table:

| Stock | Cure Time, min. | 300% Modulus, p.s.i. | Tensile at Break, p.s.i. | Elongation at Break, percent |
|---|---|---|---|---|
| A | 20 | 1,100 | 3,340 | 610 |
| B | 20 | 2,100 | 3,950 | 500 |
| C | 20 | 2,000 | 3,870 | 500 |
| D | 20 | 1,970 | 3,870 | 530 |
| E | 20 | 1,910 | 4,200 | 570 |
| F | 20 | 1,800 | 4,020 | 570 |
| A | 45 | 1,600 | 3,870 | 570 |
| B | 45 | 2,240 | 3,960 | 480 |
| C | 45 | 2,370 | 3,800 | 470 |
| D | 45 | 2,250 | 3,870 | 500 |
| E | 45 | 2,170 | 3,990 | 520 |
| F | 45 | 1,960 | 4,050 | 530 |

These data show that when tested at equal parts the new accelerators are superior to the standard benzothiazolyl disulfide in accelerating strength.

In order to demonstrate the scorch resistance of the new accelerators, the scorch times of these stocks were measured on the Mooney viscometer at 250° F. and 280° F.

| Stock | Scorch Time at— | |
|---|---|---|
| | 250° F., min. | 280° F., min. |
| A | 17½ | 7 |
| B | 23 | 9 |
| C | 25 | 9½ |
| D | 22 | 8½ |
| E | 24 | 9½ |
| F | 23 | 9 |

These data show that they exhibit greater processing safety than the standard benzothiazolyl disulfide.

The new compounds may be used to accelerate the vulcanization of any of the natural or synthetic rubbers which ordinarily lend themselves to cure with sulfur or other curing agent susceptible to acceleration, and which include rubbery polymers derived from 1,3-butadiene, such as copolymers of butadiene with styrene or acrylonitrile. Polybutadiene and polyisoprene rubbers and copolymers of isobutylene and a diolefin are among other examples.

The new accelerators may be used in combination with other compounding ingredients than those shown here. They include acceleration activators and retarders, other reinforcing agents, softeners, antioxidants, and the like to produce various types of rubber compounds.

Having thus described my invention, what I claim and desire to protect by Letters Patent is:

1. Compounds represented by the structural formula

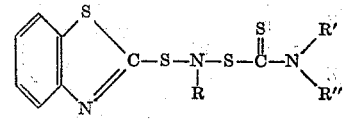

where R is a member of the group consisting of hydrogen, and hydrocarbon radicals having from 1 to 8 carbon atoms of the alkyl, cycloalkyl and aralkyl series; and R' and R" when taken as individual groups represent members from the class consisting of hydrogen, and hydrocarbon radicals having from 1 to 8 carbon atoms of the alkyl, cycloalkyl and aralkyl series, and when taken together represent a divalent chain from the group consisting of pentamethylene and oxydiethylene.

2. N - methyl - N - (dimethylthiocarbamylthio) - 2-benzothiazolesulfenamide.

3. N - ethyl - N - (dimethylthiocarbamylthio) - 2 - benzothiazolesulfenamide.

4. N - isopropyl - N - (dimethylthiocarbamylthio) - 2-benzothiazolesulfenamide.

5. A process for the preparation of compounds of claim 1 which comprises the reaction in the presence of a tertiary aliphatic amine of 2 - benzothiazolesulfenyl chloride with a compound having the structural formula

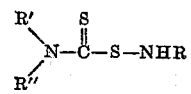

where R is a member of the group consisting of hydrogen, and hydrocarbon radicals having from 1 to 8 carbon atoms of the alkyl, cycloalkyl and aralkyl series; and R' and R" when taken as individual groups represent members from the class consisting of hydrogen, and hydrocarbon radicals having from 1 to 8 carbon atoms of the alkyl, cycloalkyl and aralkyl series, and when taken together represent a divalent chain from the group consisting of pentamethylene and oxydiethylene.
6. Compounds represented by the structural formula
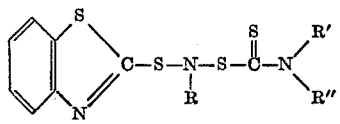
where R, R' and R" each represent an alkyl radical having from 1 to 8 carbon atoms.
References Cited in the file of this patent
UNITED STATES PATENTS
2,343,538    Ebelke _____ Mar. 7, 1944